(12) United States Patent
Takahashi et al.

(10) Patent No.: US 8,264,825 B2
(45) Date of Patent: Sep. 11, 2012

(54) FLAT TYPE IMAGE DISPLAY APPARATUS

(75) Inventors: Hitoshi Takahashi, Kanagawa (JP);
Hiroyoshi Maeda, Saitama (JP);
Masamoto Noguchi, Tokyo (JP);
Hiroyuki Ono, Tokyo (JP); Takuya Niitsu, Kanagawa (JP); Tatsuya Sakata, Tokyo (JP); Keiichi Takagi, Kanagawa (JP); Kenichi Katayama, Tokyo (JP)

(73) Assignee: Sony Corporation, Tokyo (JP)

( * ) Notice: Subject to any disclaimer, the term of this patent is extended or adjusted under 35 U.S.C. 154(b) by 679 days.

(21) Appl. No.: 11/473,502

(22) Filed: Jun. 23, 2006

(65) Prior Publication Data

US 2006/0238446 A1 Oct. 26, 2006

Related U.S. Application Data

(63) Continuation of application No. 10/491,462, filed on Mar. 31, 2004, now Pat. No. 7,120,011.

(30) Foreign Application Priority Data

Aug. 2, 2002 (JP) .............................. P2002-226047
Aug. 2, 2002 (JP) .............................. P2002-226048
Aug. 2, 2002 (JP) .............................. P2002-226049

(51) Int. Cl.
*G06F 1/16* (2006.01)
*G06F 3/41* (2006.01)
*G06F 3/038* (2006.01)
*H05K 5/00* (2006.01)
*H05K 7/00* (2006.01)
*G09G 3/20* (2006.01)
*G09G 5/00* (2006.01)

(52) U.S. Cl. .................... 361/679.02; 345/55; 345/173; 345/204

(58) Field of Classification Search .................. 345/55, 345/156, 204, 905, 30; 348/836, 846; 361/679.02–679.29; 349/58–60
See application file for complete search history.

(56) References Cited

U.S. PATENT DOCUMENTS

| 3,926,439 | A | * | 12/1975 | Chao et al. ................... 273/237 |
| 5,400,408 | A | | 3/1995 | Lundgren et al. |
| 5,606,594 | A | | 2/1997 | Register et al. |
| 5,683,070 | A | | 11/1997 | Seed |

(Continued)

FOREIGN PATENT DOCUMENTS

EP 1 174 847 1/1992

(Continued)

*Primary Examiner* — Alexander S Beck
*Assistant Examiner* — Charles Hicks
(74) *Attorney, Agent, or Firm* — Frommer Lawrence & Haug LLP; William S. Frommer; Thomas F. Presson

(57) ABSTRACT

A flat image display device that has a bracket and a frame section integrally formed by a transparent material, an apparatus mounting section is disposed in an inner peripheral edge of the frame section, and parts fixing sections that are disposed on the outside of the frame section. A front panel is formed by a transparent material and disposed on the front surface side of the bracket; an apparatus body section has a screen surface that is mounted at the apparatus mounting section of the bracket. One or more signal paths send and receive electric signals between the apparatus body section and the functional sections. This enables sending and receiving of electric signals between the apparatus body section and the functional sections that send and receive electric signals to exhibit a predetermined function.

7 Claims, 14 Drawing Sheets

U.S. PATENT DOCUMENTS

| | | | |
|---|---|---|---|
| 5,870,282 A | 2/1999 | Andre et al. | |
| 6,052,275 A * | 4/2000 | Joseph | 361/679.23 |
| 6,104,606 A | 8/2000 | Vossler | |
| 6,338,182 B1 | 1/2002 | Tseng et al. | |
| 6,560,124 B1 * | 5/2003 | Irie et al. | 361/816 |
| 6,750,922 B1 * | 6/2004 | Benning | 348/818 |
| 6,999,595 B2 * | 2/2006 | Anderson et al. | 381/333 |
| 7,348,964 B1 * | 3/2008 | Gettemy et al. | 345/173 |
| 2002/0050958 A1 * | 5/2002 | Matthies et al. | 345/55 |

FOREIGN PATENT DOCUMENTS

| | | |
|---|---|---|
| EP | 1 248 281 | 10/2002 |
| JP | 9 113880 | 5/1997 |
| JP | 10 83143 | 3/1998 |
| JP | 11 133871 | 5/1999 |
| JP | 11 352897 | 12/1999 |
| JP | 2000 148039 | 5/2000 |
| JP | 2002 158944 | 5/2002 |
| JP | 2003 219317 | 7/2003 |
| TW | 494 422 | 7/2002 |

* cited by examiner

FLAT TYPE IMAGE DISPLAY APPARATUS

This application is a continuation of U.S. application Ser. No. 10/491,462, filed Mar. 31, 2004, which was granted as U.S. Pat. No. 7,120,011 on Oct. 10, 2006, the entire contents of which is incorporated herein by reference.

TECHNICAL FIELD

The present invention relates to a flat type image display apparatus. Specifically, the invention relates to a technical field that enables to send and receive electric signals between an apparatus body section and a functional section that sends and receives electric signals and exhibits a predetermined function, while maintaining good design quality.

BACKGROUND ART

As a flat type image display apparatus displaying images on a screen, there is, for example, one that uses as a screen a plasma display panel (PDP) or the like.

In flat type image display apparatuses, the type that disposes a screen so as to be surrounded by a frame section called bezel has been widely used. However, there is estimated the spread of flat type image display apparatuses of various type seeking for a higher design quality, in order to meet the request of recent market.

As an example of flat type image display apparatuses seeking for a higher design quality, there is being developed one which has a transparent front panel formed by, for example, glass, resin or the like, and in which an apparatus body section having a screen is fixed to a transparent bracket disposed on the rear side of the front panel. In this flat type image display apparatus, a pair of speakers is arranged on the outer side of the front panel, for example, on the right and left of the front panel, respectively. Since in this flat type image display apparatus the transparent front panel is disposed on the front surface side of the bracket, it appears that the screen is in the state of floating in the air when viewing the flat type image display apparatus. In addition, since it has no bezel, a viewer receives an open feeling in terms of design.

In the meantime, in a flat type image display apparatus, it is necessary to send an electric signal for outputting sound from the apparatus body section to speakers. In a flat type image display apparatus of the type having the above-mentioned front panel and bracket, a pair of speakers are disposed on the outside of the front panel, and it is therefore necessary to do wiring between the apparatus body section and the speakers.

In the case where a substrate for wiring and a conductive member are disposed on the rear surface side of a bracket, however, these substrate and conductive member are bare. In this case, although it is also possible to provide a cover for covering the substrate and conductive member, the number of parts is increased by the amount to provide the cover, thus increasing the cost.

Further in some cases, a transparent portion exists between an apparatus body section and speakers. When doing wiring in such a transparent portion, it is also required not to damage good design quality of a flat type image display apparatus by arranging such that the substrate and conductive member would not cause a sense of strangeness in its appearance.

Therefore, the present invention has for its task to enable sending and receiving of electric signals between an apparatus body section and a functional section that sends and receives electric signals to exhibit a predetermined function, while maintaining good design quality.

DISCLOSURE OF THE INVENTION

A flat type image display apparatus of the present invention is provided with a bracket that has a frame section formed integrally by a transparent material, an apparatus mounting section disposed in an inner peripheral edge of the frame section, and a parts fixing section disposed on the outside of the frame section; a front panel that is formed by a transparent material and disposed on the front surface side of the bracket; an apparatus body section that has a screen surface and is mounted at the apparatus mounting section of the bracket; a holding member that holds the front panel and the bracket in such a way that they are connected together at the front and rear; a functional section that is fixed to the parts fixing section of the bracket so as to be disposed on the outside of the front panel, and that sends and receives electric signals to exhibit a predetermined function. A signal path performing sending and receiving of electric signals between the apparatus body section and the functional, section is formed in the inside of the bracket or in a boundary portion between the front panel and the bracket.

Accordingly, in the flat type image display apparatus of the present invention, sending and receiving of electric signals is performed through the inside of the bracket or the boundary portion between the front panel and the bracket.

BEST MODE FOR CARRYING OUT THE INVENTION

With reference to the accompanying drawings, the details of a flat type image display apparatus of the present invention will be described hereinafter. Note that the following preferred embodiment is one that is applied to a flat type image display apparatus wherein a plasma display panel is used as a screen.

Figure 1:
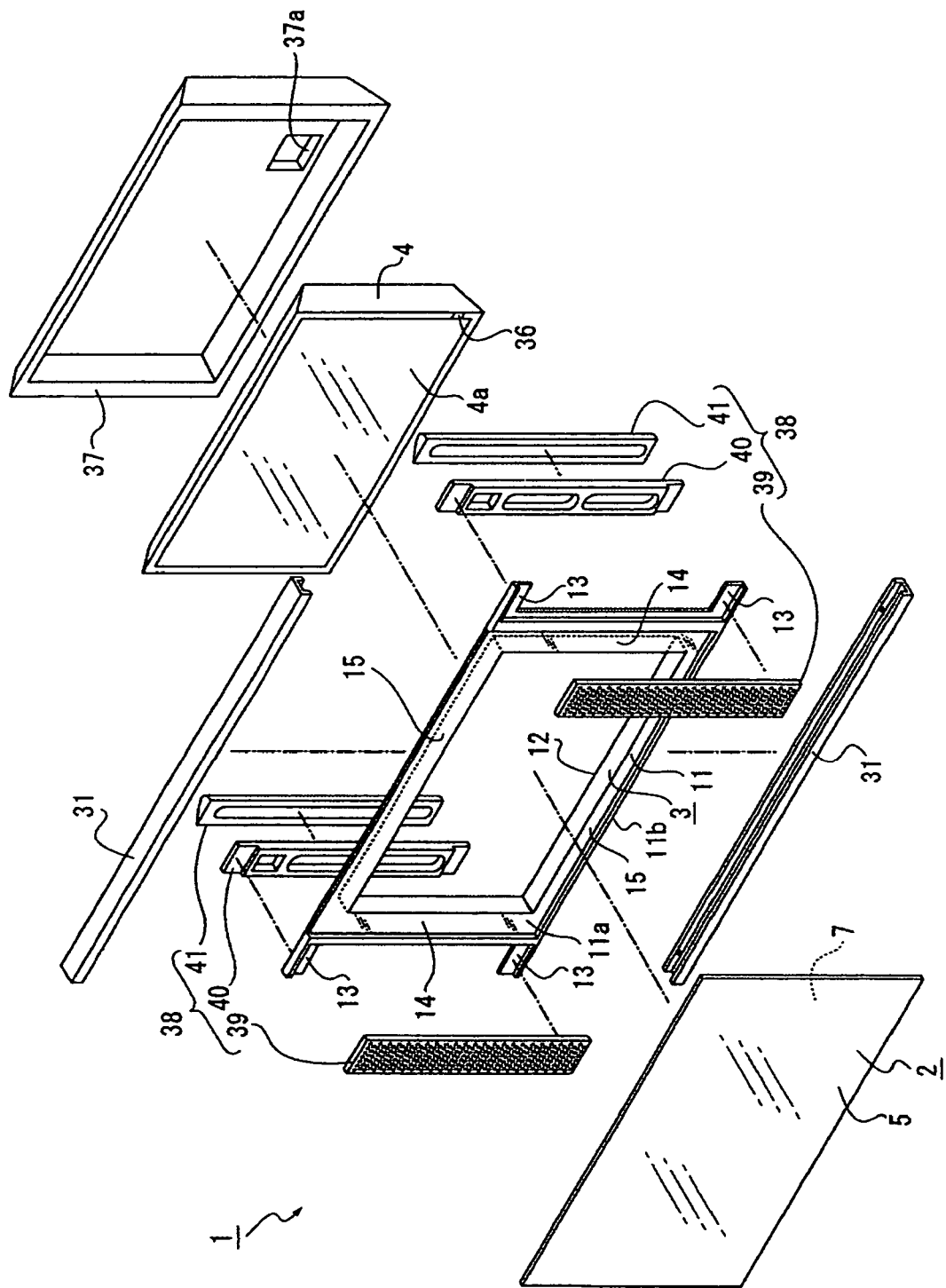
FIG. 1 shows, together with FIG. 2 through FIG. 15, one preferred embodiment of the present invention, and the figure is a schematic exploded perspective view of a flat type image display apparatus.

A flat type image display apparatus 1 is provided with a front panel 2, a bracket 3 and an apparatus body section 4 (see FIG. 1).

The front panel 2 is formed in a landscape oriented rectangle and formed by a transparent material such as glass, polycarbonate, acryl or the like. An anti-reflective film 6 for preventing reflection of external light is attached to the entire surface of a front surface 5 of the front panel 2 (see FIG. 2).

Figure 2:
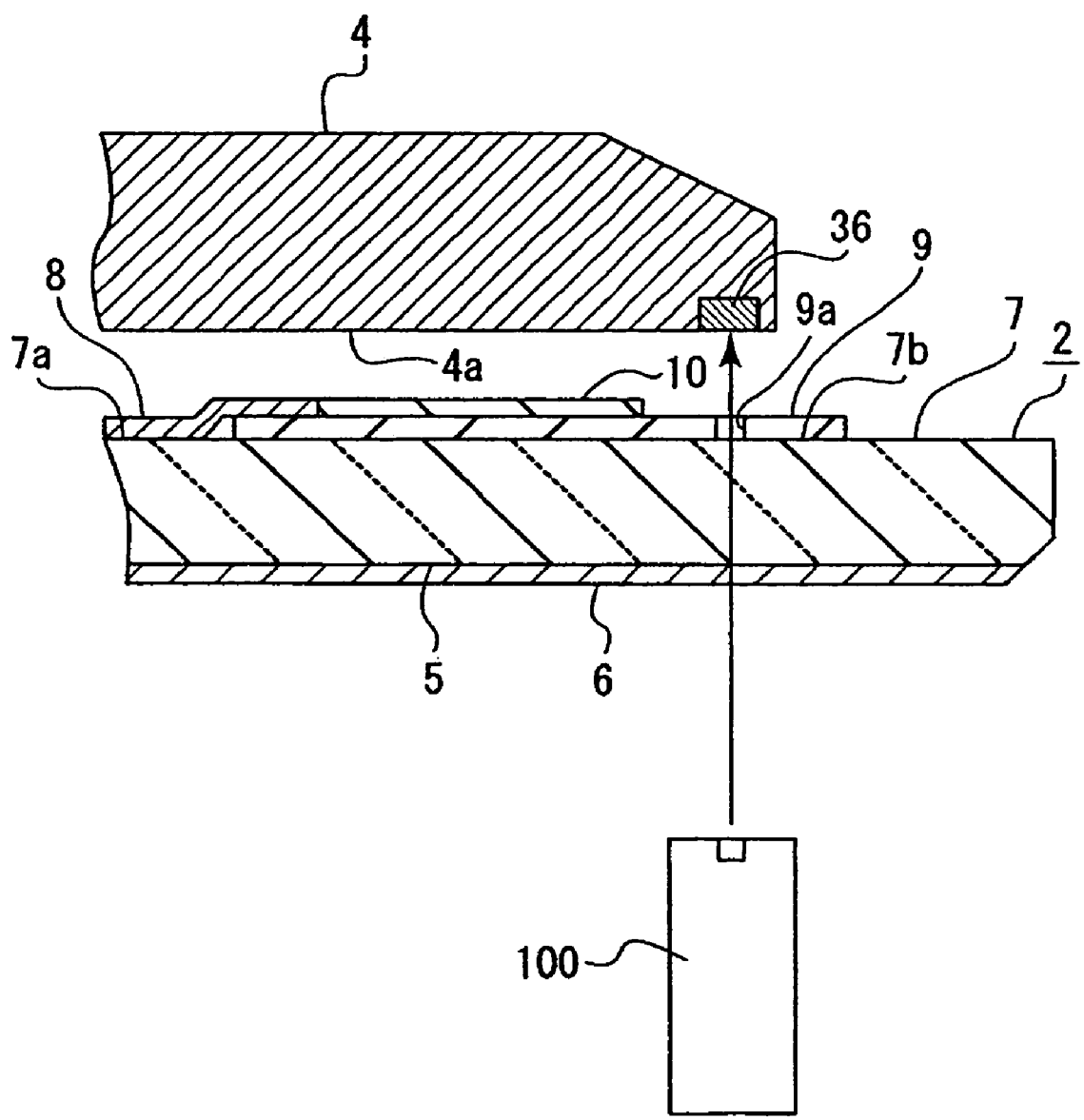
FIG. 2 is an enlarged sectional view showing the positional relation between a front panel and a light receiving section.

A rear surface 7 of the front panel 2 is constructed by an attached portion 7a and a non-attached portion 7b, and the area of the rear surface 7 except for its outer peripheral portion is defined as the attached portion 7a and the outer peripheral portion is defined as the non-attached portion 7b (see FIG. 2). An infrared absorption film 8 is stuck to the attached portion 7a of the front panel 2. Therefore, the infrared absorption film 8 is not stuck to the non-attached portion 7b.

Figure 3:
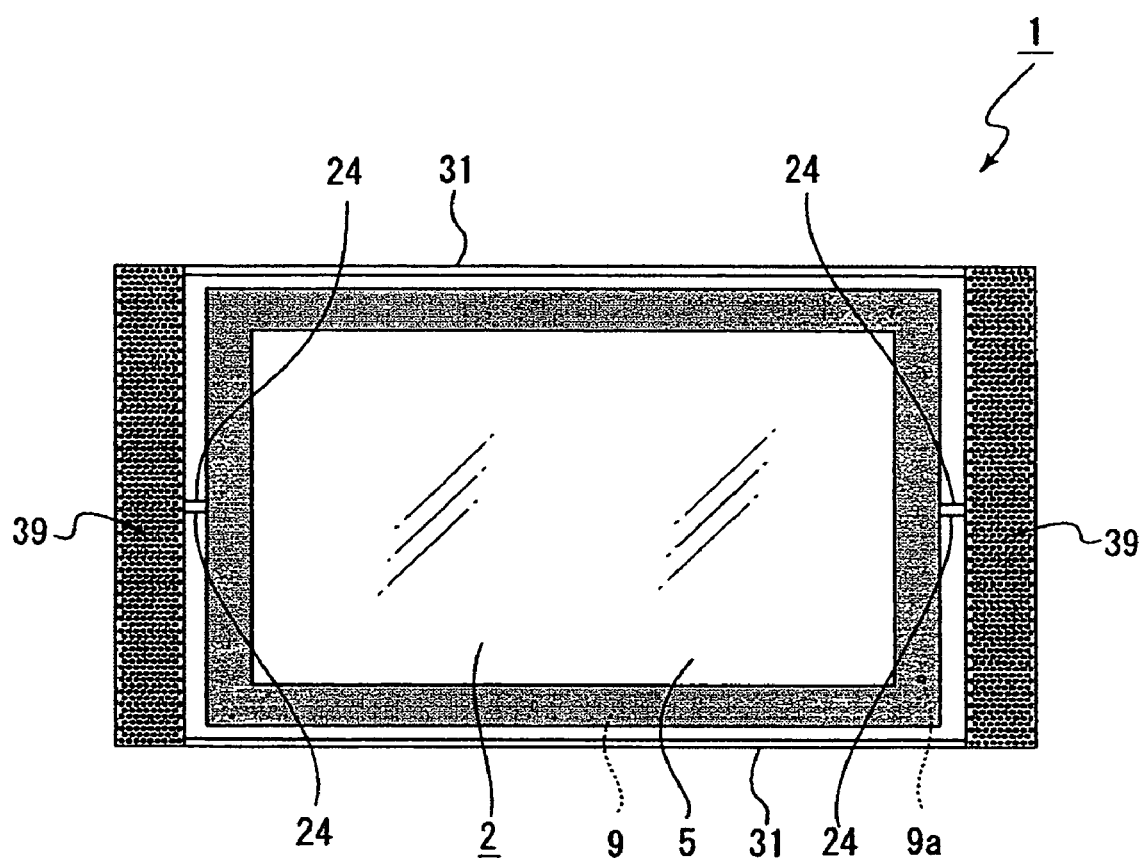
FIG. 3 is a front view of a flat type image display apparatus.

A frame-like shielding layer 9 is disposed in the non-attached portion 7b of the front panel 2, except for its outer peripheral edge (see FIG. 2 and FIG. 3). The shielding layer 9 is formed by, for example, black ceramic printing. Therefore, when viewing the front panel 2 from the front surface side, its rear side portions are shielded and invisible by the shielding layer 9.

The rear surface of the shielding layer 9 is provided with a frame-like conductive layer 10 (see FIG. 2). The conductive layer 10 is disposed on the area of the shielding layer 9 except for its outer peripheral portion and inner peripheral portion. The conductive layer 10 is, for example, a mesh-like film layer formed by a metal material, and serves to earth with a later described body cover attached thereto, which is made of metal.

To the inner peripheral side portion in the area of the shielding layer 9 on which the conductive layer 10 is not provided, the outer peripheral edge of the infrared absorption film 8 is stuck from the rear side (see FIG. 2).

In the outer peripheral side portion in the area of the shielding layer 9 on which the conductive layer 10 is not provided, a transmitting hole 9a that is small in diameter is formed by, for example, masking technique (see FIG. 2 and FIG. 3). The transmitting hole 9a is a hole through which infrared light emitted from a remote control apparatus 100 is transmitted (see FIG. 2). The transmitting hole 9a is formed in, for example, the lower right portion of the shielding layer 9 (see FIG. 3), however, the location at which the transmitting hole 9a is formed is arbitrary, and it may be formed at any location of the shielding layer 9 at which the infrared absorption film 8 and conductive layer 10 are not disposed.

Figure 5:
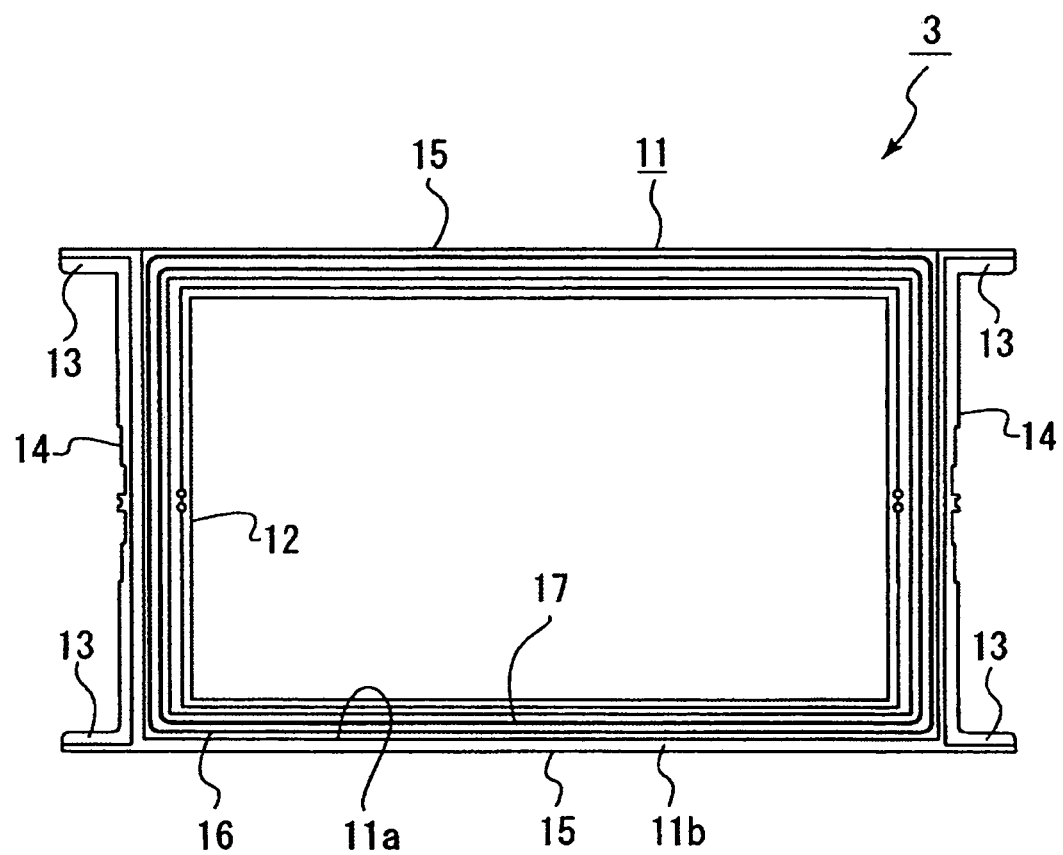
FIG. 5 is a front view of a bracket.
Figure 6:
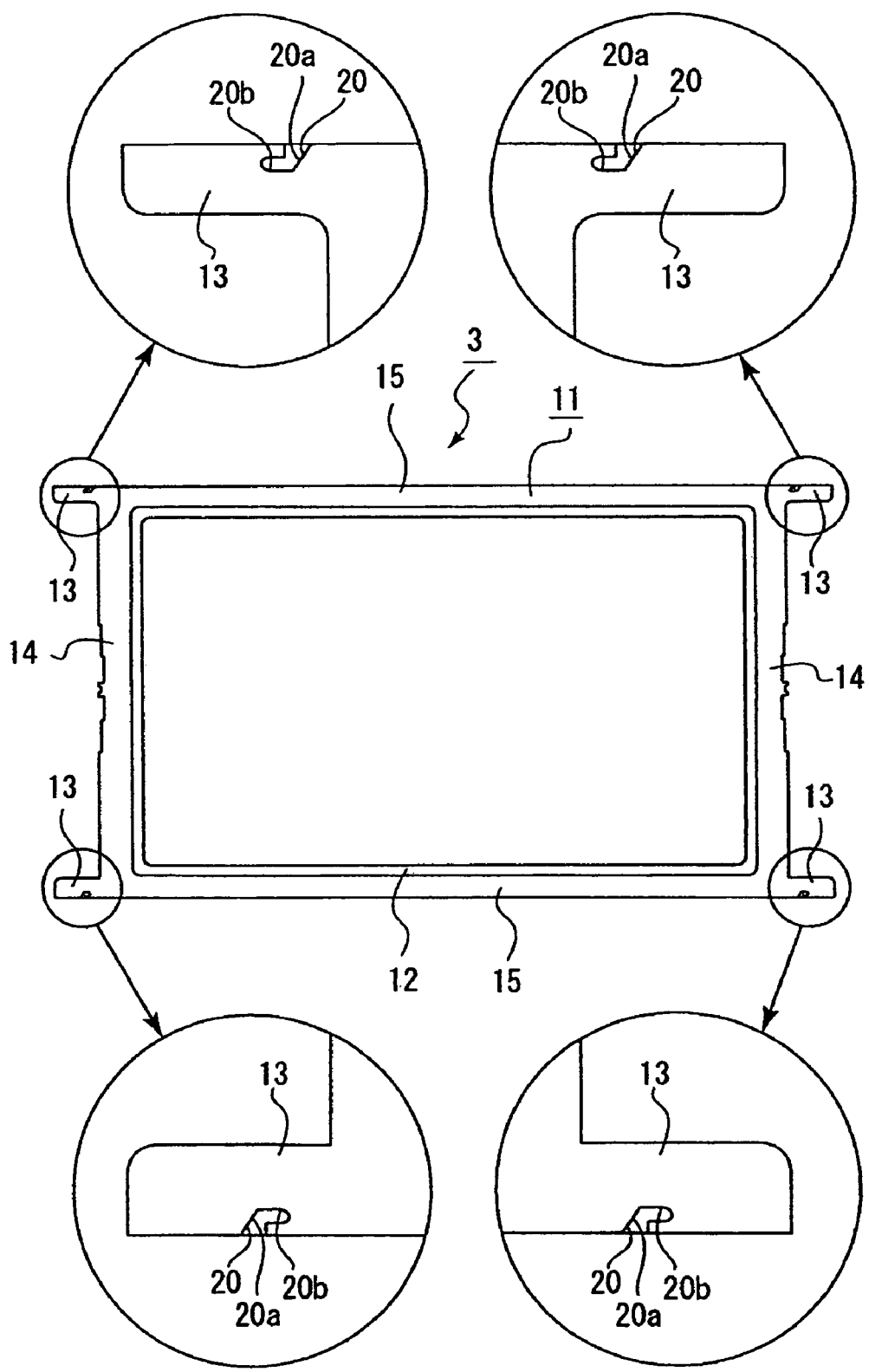
FIG. 6 is a rear view of a bracket.

In the bracket 3, a frame section 11, an apparatus mounting section 12 and parts fixing sections 13, 13, ... are integrally formed by a transparent resin material such as polycarbonate, acryl or the like (see FIG. 1, FIG. 5, and FIG. 6).

The frame section 11 is formed so that its shape is in a landscape oriented rectangle having a size larger than the front panel 2, and also formed in such a shape that is thin in thickness by vertical parts 14, 14, which extend in the up-down direction and are located right and left, and horizontal parts 15, 15, which extend in the right-left direction and are located above and below. A shallow disposing recess 11a at which the front panel 2 is disposed is formed in the frame section 11, and the disposing recess 11a is opened upward and forward (see FIG. 1, FIG. 5 and FIG. 7).

Figure 7:
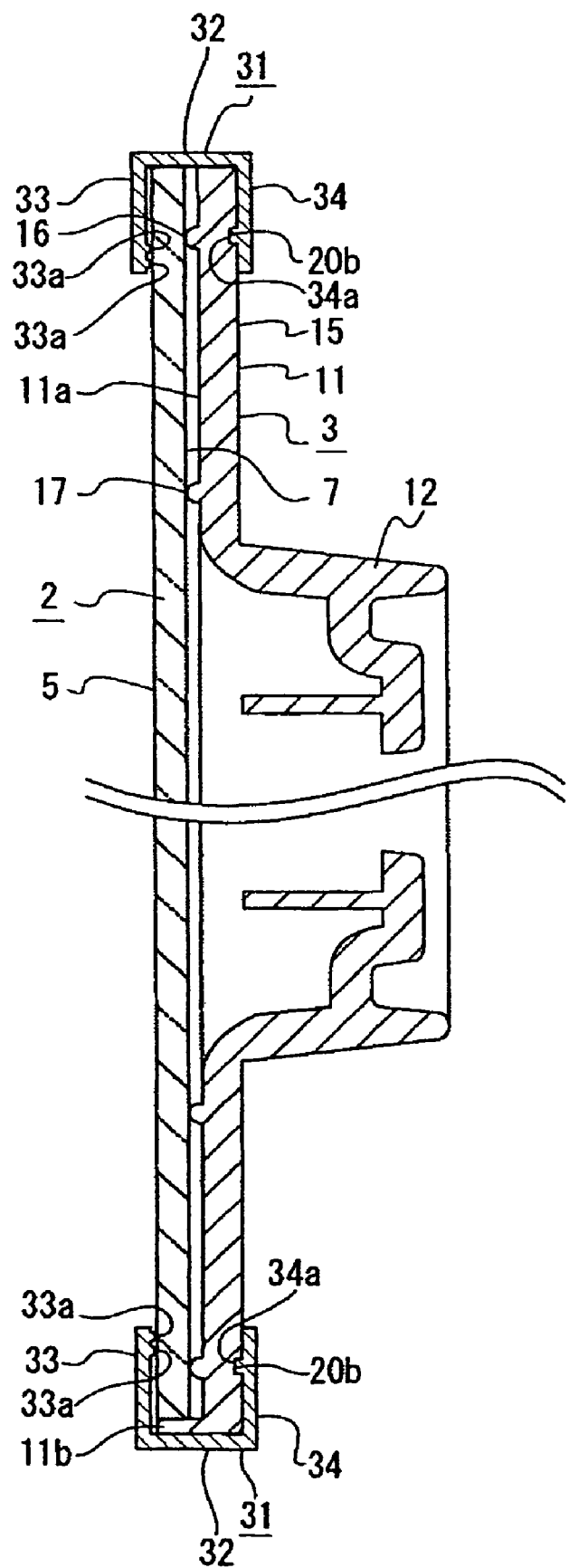
FIG. 7 is an enlarged sectional view showing the state that a front panel and a bracket are connected together by a holding member.

Through forming the disposing recess 11a, a mounting part 11b that extends in the right-left direction and projected forward is provided at a lower end of the frame section 11 (see FIG. 1, FIG. 5 and FIG. 7).

Ribs 16 and 17 that are projected forward are provided in the outer peripheral edge and inner peripheral edge of the front surface of the frame section 11, respectively (see FIG. 5 and FIG. 7). Four disposing notches 16a, 16a, ..., and four disposing notches 17a, 17a, ..., are formed in the ribs 16 and 17, respectively (see FIG. 8). The disposing notches 16a, 16a, ... are formed in the part of the rib 16 which is located at approximately the center in the up-down direction of the vertical parts 14, 14, and the paired ones are formed apart up and down positions. The disposing notches 17a, 17a, ... are formed at inside locations of the disposing notches 16a, 16a, ..., respectively.

Figure 8:
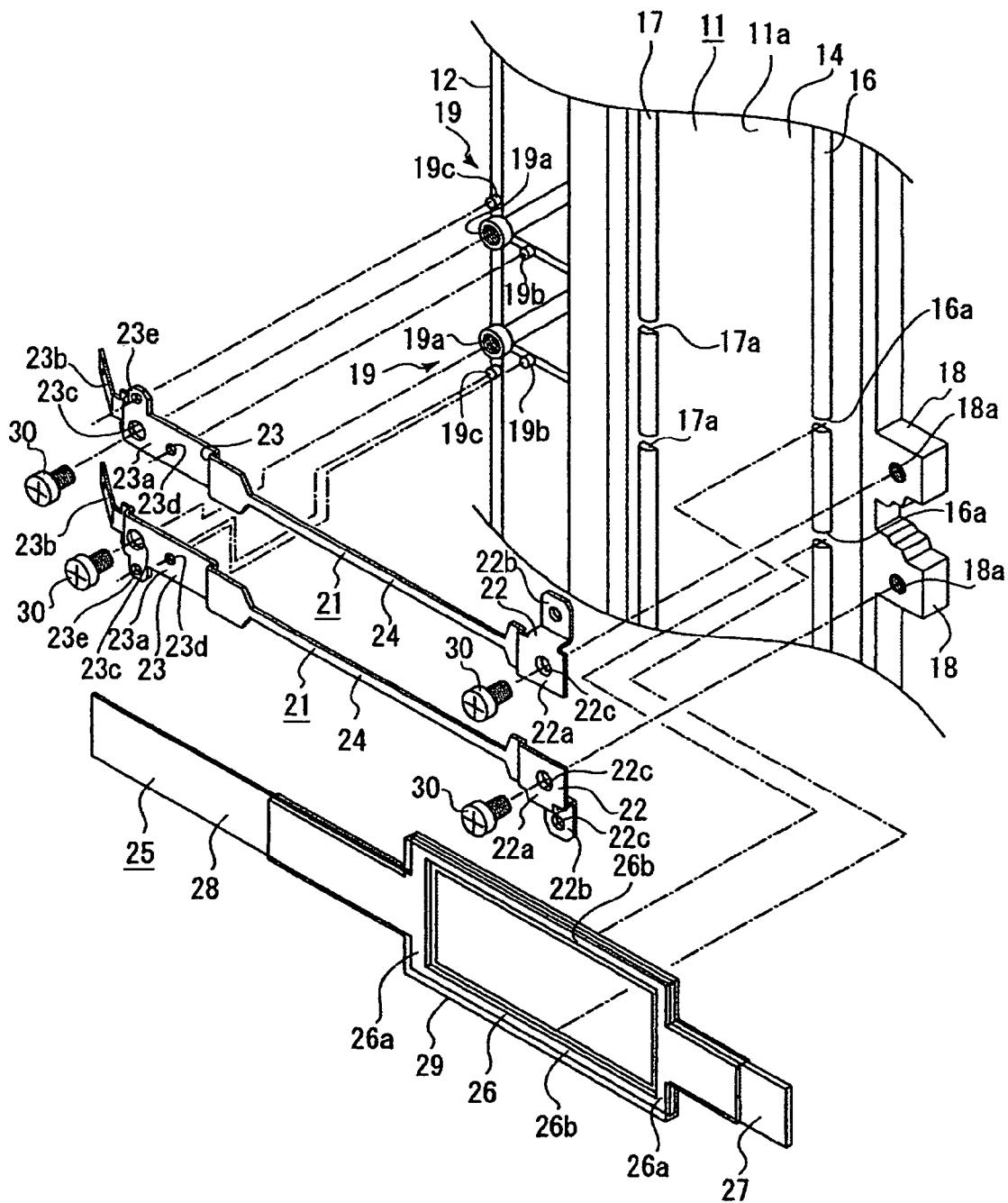
FIG. 8 is an enlarged exploded perspective view showing a conductive member, an earth wiring sheet and part of a bracket.

First terminal fixing portions 18, 18, ... of each pair are provided in the vertical parts 14, 14 of the frame section 11 (see FIG. 8). The first terminal fixing portions 18, 18, ... are individually disposed at an immediately outside locations of the disposing notches 16a, 16a, ... of the ribs 16, 16. Tapped holes 18a, 18a, ..., which are opened forward, are formed in the first terminal fixing portions 18, 18, ..., respectively.

The apparatus mounting section 12 is disposed so as to project from the inner peripheral edge of the frame section 11 to backward (see FIG. 1 and FIG. 6).

Second terminal fixing portions 19, 19, ... of each pair are disposed right and left, respectively, in the front edge of the apparatus mounting section 12 (see FIG. 8). The second terminal fixing portions 19, 19, ... are disposed at immediately inside locations of the disposing notches 17a, 17a, ... of the ribs 17, 17, respectively. The second terminal fixing portions 19, 19, ... have tapped holes 19a, 19a, ..., which are opened forward, first positioning protrusions 19b, 19b, ... which are projected forward, and second positioning protrusions 19c, 19c, ..., which are similarly projected forward.

The parts fixing sections 13, 13, ... are respectively disposed so as to project rightward or leftward from both upper and lower ends of the frame section 11 (see FIG. 1, FIG. 5 and FIG. 6).

Engagement slots 20, 20, ..., each functioning as an engagement part to be held, are formed on the rear surface of the parts fixing sections 13, 13 (see FIG. 6). The engagement slot 20 consists of a lead-in portion 20a that is opened in the upper surface or lower surface of the parts fixing section 13 and extends in the approximately up-down direction, and a stopper portion 20b that is continuous with the lead-in portion 20a and extends in the right-left direction. The lead-in portion 20a is formed so that the slot width is wider as it approaches the upper surface or lower surface of the parts fixing section 13.

Figure 9:
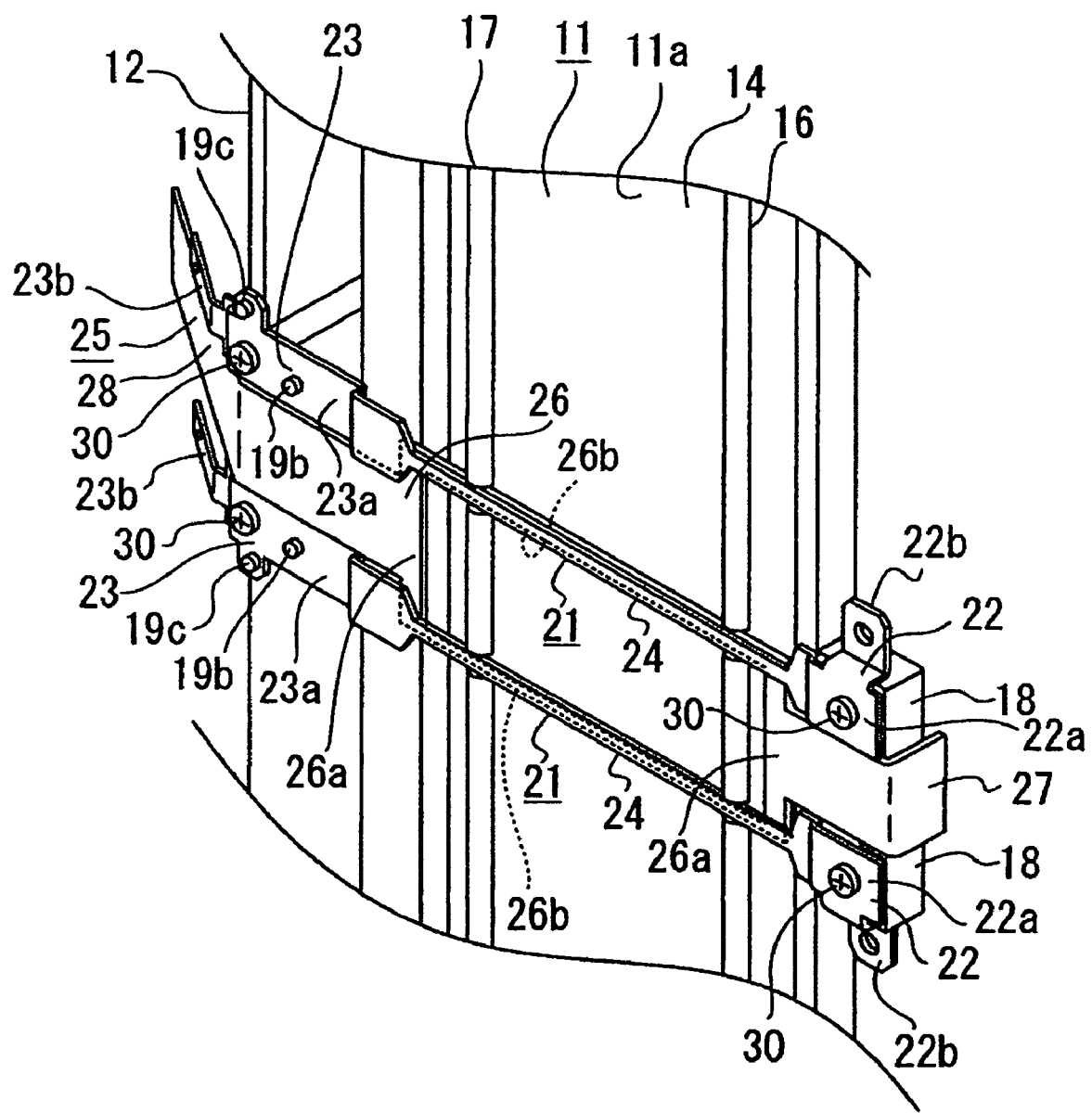
FIG. 9 is an enlarged perspective view showing the state that a conductive member and an earth wiring sheet are attached to a bracket.

Conductive members 21, 21, ... are fixed between the first terminal fixing portions 18, 18, ... and the second terminal fixing portions 19, 19, ... of the bracket 3, respectively (see FIG. 8 and FIG. 9).

The conductive member 21 is formed by connecting a first terminal part 22 and a second terminal part 23 with a connecting part 24 that extends in right-left direction, and is formed by a plate-like metal material. The first terminal part 22 is connected to an outside end of the connecting part 24, and consists of a portion to be fixed 22a that is continuous with the connecting part 24 and a connecting portion 22b that is projected upward or downward from the portion fixed 22a. A screw through hole 22c is formed in the portion fixed 22a.

The second terminal part 23 is connected to an inside end of the connecting part 24, and consists of a portion to be fixed 23a that is continuous with the connecting part 24 and a connecting portion 23b that is projected obliquely rearward from the portion fixed 23a. A screw through hole 23c, a first positioning hole 23d and a second positioning hole 23e are respectively formed in the portion fixed 23a.

In addition to the above-mentioned conductive members 21, 21, . . . , earth wiring sheets 25, 25 are attached to the bracket 3 (see FIG. 8 and FIG. 9). The earth wiring sheet 25 has a base part 26 in the shape of a landscape-shaped oriented frame, and connecting protrusions 27, 28 projected rightward or leftward from the base-part 26, which are formed by a sheet-like material having conductivity.

The base part 26 consists of short-direction portions 26a, 26a that extend in the up-down direction and are located right and left, and long-direction portions 26b, 26b that extend in the right-left direction and are located above and below. The connecting protrusion 27 is projected outward from approximately the center in the up-down direction of the long-direction portion 26b that is located outside, and the connecting protrusion 28 is projected inward from approximately the center in the up-down direction of the long-direction portion 26b that is located inside.

The area of the earth wiring sheet 25, except for the respective tip portions of the connecting protrusions 27, 28, is coated with an insulating laminate 29 (see FIG. 8).

The procedure of fixing the conductive members 21, 21, . . . and the earth wiring sheets 25, 25 to the bracket 3 will be described hereinafter (see FIG. 8 and FIG. 9). Note that the procedure when fixing the conductive members 21, 21 and the earth wiring sheet 25 which are located on the right side will be described as an example.

First, the long-direction portions 26b, 26b of the earth wiring sheet 25 are inserted in and disposed at the disposing notches 16a, 17a, 16a, 17a of the ribs 16, 17 of the bracket 3.

Next, the connecting parts 24, 24 of the conductive members 21, 21 are superposed from the front on the long-direction portions 26b, 26b of the earth wiring sheet 25, respectively, and then inserted in the disposing notches 16a, 17a, 16a, 17a.

At this time, the first positioning protrusions 19b, 19b and the second positioning protrusions 19c, 19c of the second terminal fixing portions 19, 19 of the bracket 3 are respectively inserted in the first positioning holes 23d, 23d and the second positioning holes 23e, 23e of the conductive members 21, 21. Fixing screws 30, 30, . . . , which are passed through individual screw through holes 22c, 22c, 23c, 23c, are screwed through the individual tapped holes 18a, 18a, 19a, 19a, and the portions fixed 22a, 22a, 23a, 23a are respectively fixed to the first terminal fixing portions 18, 18 and the second terminal fixing portions 19, 19.

Finally, the individual connecting parts 22b, 22b, 23b, 23b of the conductive members 21, 21 and the tip portions of the individual connecting protrusions 27, 28 of the earth wiring sheet 25 are connected to a predetermined connecting terminal and a lead wire and the like, each of which is not shown.

As described above, the fixing of the conductive members 21, 21, . . . and the earth wiring sheets 25, 25 to the bracket 3 is attained only by disposing the earth wiring sheets 25, 25 at a predetermined position, and superposing from its front side the conductive members 21, 21, . . . , following by screwing. Therefore the fixing is easy and it is capable of improving operating performance in fixing operation.

The front panel 2 and the bracket 3 are held in the state that they are connected together by the holding member 31, 31 (see FIG. 1 and FIG. 7).

Figure 10:
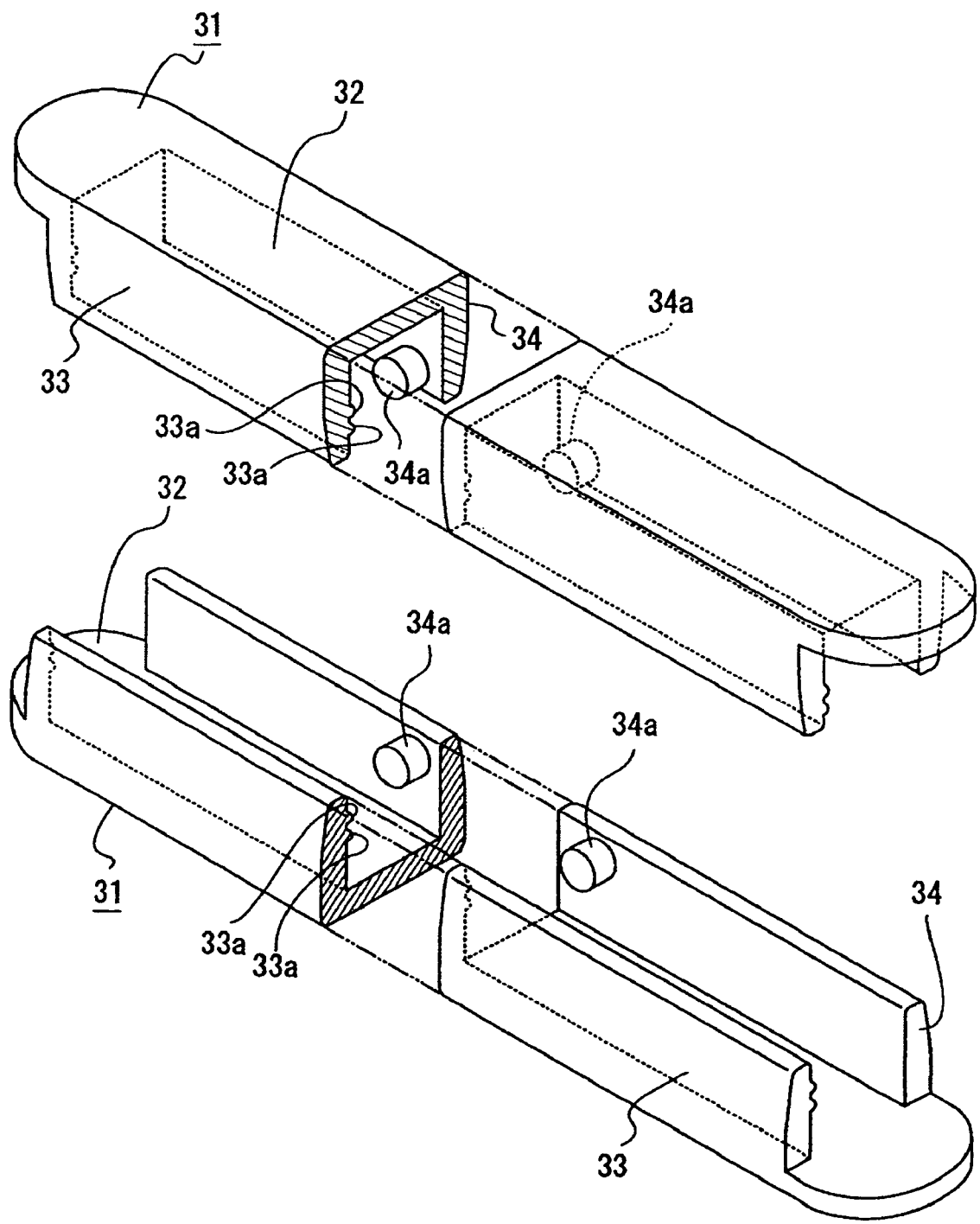
FIG. 10 is an enlarged perspective view of a holding member.
Figure 11:
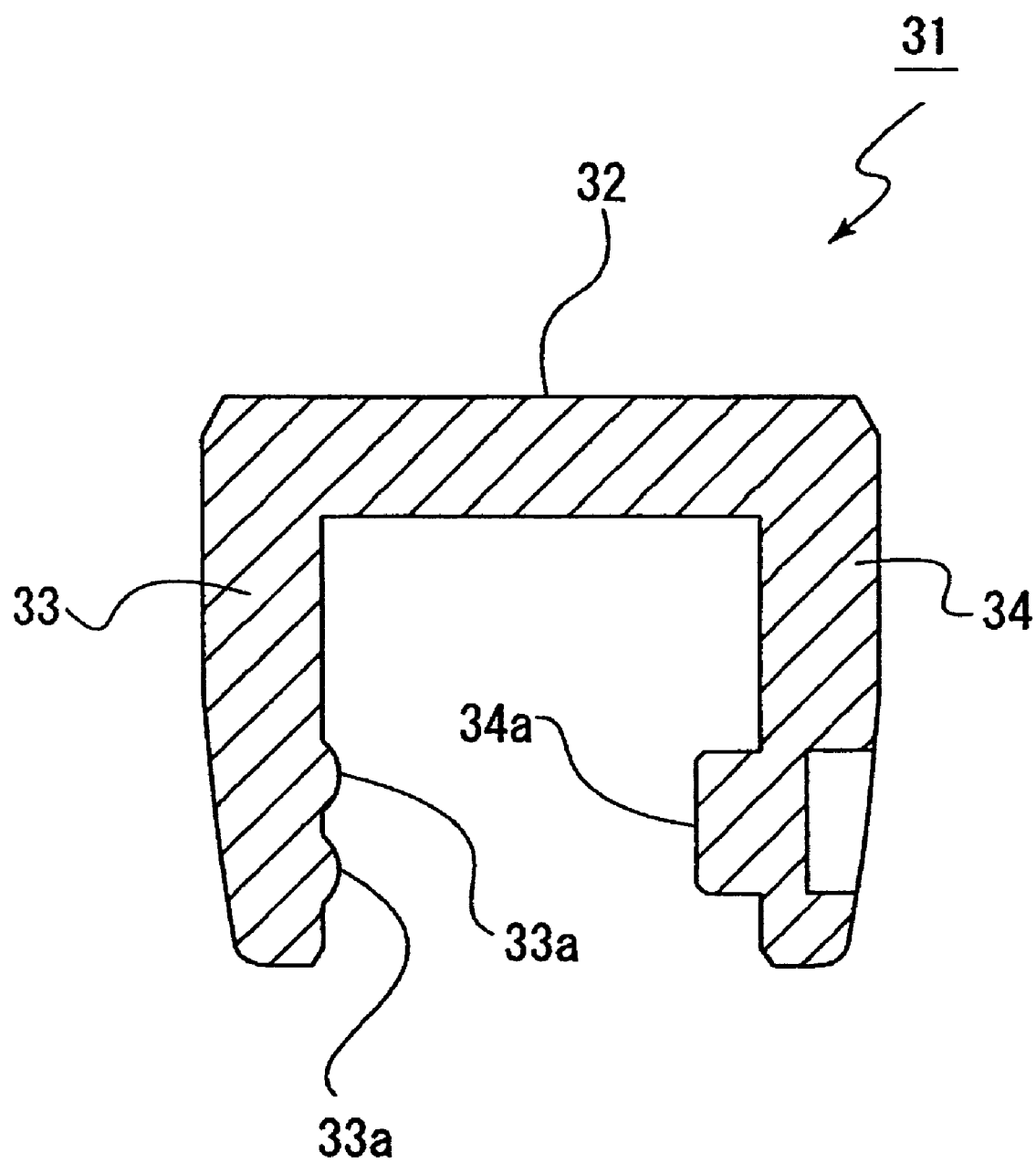
FIG. 11 is an enlarged sectional view of a holding member.

The holding member 31 is formed long to the right-left direction, and formed so that its length is approximately the same as the distance between the outer ends of the parts fixing sections 13, 13 that are located on the right and left of the bracket 3. The holding section 31 is made up of a base part 32, a front-side gripping part 33 that is projected from the front edge of the base part 32 in the direction orthogonal thereto, and a rear-side gripping part 34 that is projected from the rear edge of the base part 32 in the direction orthogonal thereto and located opposite to the front-side gripping part 32, which parts are integrally formed by a metal material (see FIG. 10 and FIG. 11).

In the internal surface of the front-side gripping part 33, pressing ribs 33a, 33a that extends in the right-left direction and are projected to the rear-side gripping part 34 side are disposed apart up and down positions. In the internal surface of the rear-side gripping part 34, engagement protrusions 34a, 34a that are projected to the front-side gripping part 33 side are provided. The engagement protrusions 34a, 34a are disposed at a location toward the left end and a location toward the right end of the rear-side gripping part 34, respectively, and function as a holding engagement portion to be inserted in and engaged to the engagement slots 20, 20 formed in the bracket 3.

Figure 12:
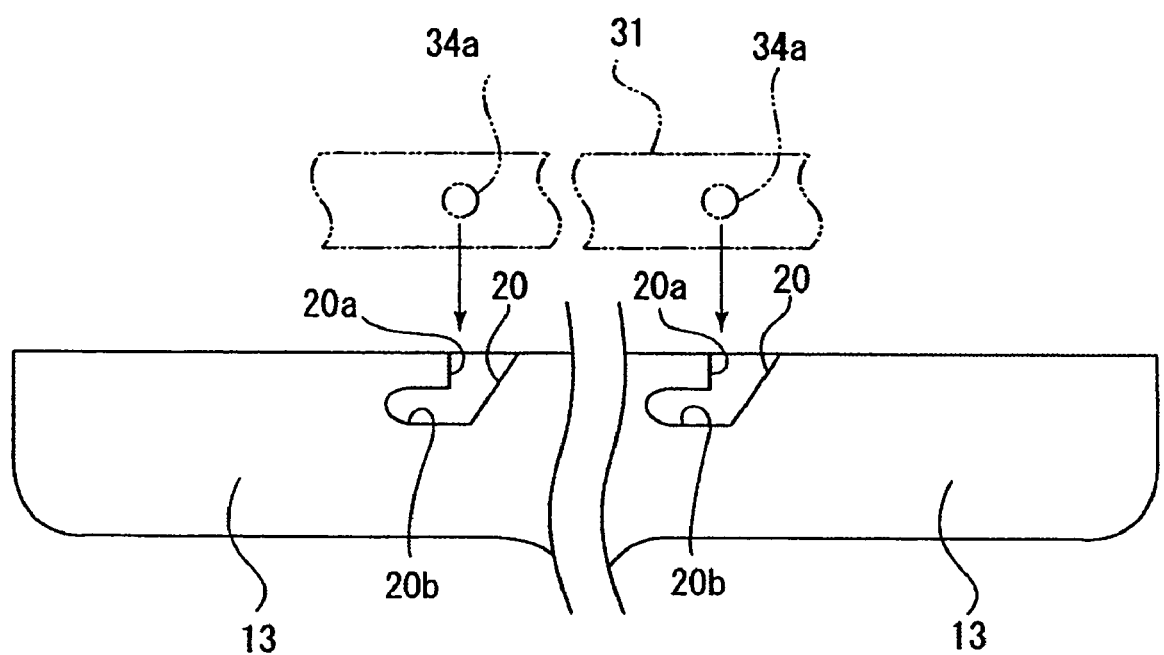
FIG. 12 shows, together with FIG. 13 and FIG. 14, the procedure when engagement protrusions of a holding member are engaged to engagement slots of a bracket, and the figure is a conceptual diagram showing the state that the engagement protrusions are located above the engagement slots.

The procedure of connecting the front panel 2 and the bracket 3 will be described hereinafter (see FIG. 12 through FIG. 14). Note that the procedure when connecting the front panel 2 and the bracket 3 by the holding member 31 located at an upper side will be described as an example.

First, the front panel 2 is inserted in and disposed at the disposing recess 11a of the bracket 3. Since at this time the front panel 2 is mounted at amounting portion disposed at a lower end of the bracket 3, the front panel 2 can be disposed easily at the disposing recess 11a, and it is also possible to prevent the front panel 2 from dropping out of the bracket 3.

Figure 13:
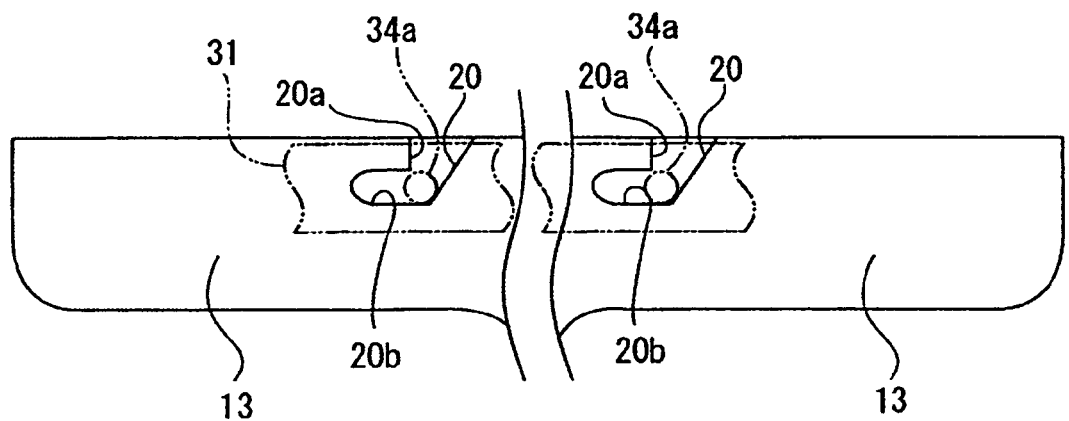
FIG. 13 is a conceptual diagram showing the state that engagement protrusions are inserted in lead-in portions of engagement slots.
Figure 14:
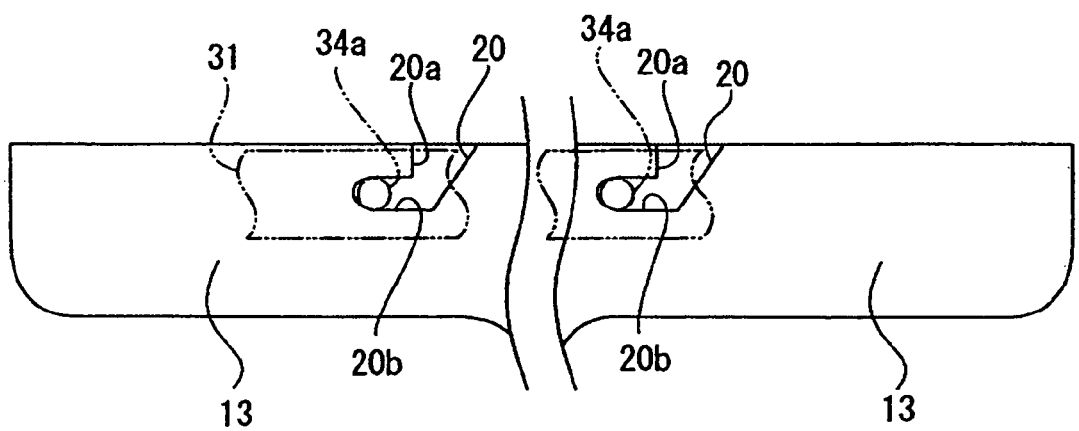
FIG. 14 is a conceptual diagram showing the state that the engagement protrusions are engaged to stopper portions of the engagement slots.

Next, the engagement protrusions 34a, 34a of the holding member 31 are respectively located above the lead-in portions 20a, 20a of the engagement slots 20, 20 of the bracket 3 (see FIG. 12), and the holding member 31 is depressed to insert the engagement protrusions 34a, 34a in the lead-in portions 20a, 20a, respectively (see FIG. 13). Since the lead-in portions 20a, 20a are, as described above, formed so that the slot width is wider as it goes upward, the insertion of the lead-in portions 20a, 20a of the engagement protrusions can be performed easily.

Subsequently, the holding member 31 is allowed to slide along the upper edge of the bracket 3, so that the engagement protrusions 34a, 34a are inserted in and engaged to the stopper parts 20b, 20b, respectively (see FIG. 14).

Also for the other holding member 31, in the same manner as above, the engagement protrusions 34a, 34a are inserted in and engaged to the stopper parts 20b, 20b, respectively, thereby completing the operation of connecting the front panel 2 and the bracket 3.

Thus, in the state that the front panel 2 and the bracket 3 are connected together by the holding members 31, 31, the pressing ribs 33a, 33a provided in the holding members 31, 31 are pressed against both upper and lower ends of the front surface 5 of the front panel 2, respectively (see FIG. 7). Therefore, the contact area between the front panel 2 and the holding members 31, 31 is reduced to make it difficult to cause dust and the like due to friction between the front panel 2 and the holding members 31, 31. In addition, even if dust and the like occur, the dust and the like remain in the inside of the holding members 31, 31. Hence, when viewing the flat type image display apparatus 1, there is no possibility that dust and the like are noticeable, thereby enabling to maintain good design quality of the flat type image display apparatus 1.

Further, in the state that the front panel 2 and the bracket 3 are connected together, the front panel 2 is pressed against the ribs 16, 17 disposed in the bracket 3, so that the front panel 2 and the bracket 3 are arranged with slight spacing (see FIG. 7). Therefore, dust and the like due to friction between the front panel 2 and the bracket 3 are less likely to occur, and it is also able to prevent the two from wearing.

Furthermore, in the state that the front panel 2 and the bracket 3 are connected together, the rib 16 provided in the bracket 3 is shielded by the holding members 31, 31 (see FIG. 7). Hence, even if dust and the like occur due to the friction between the lower surface of the front panel 2 and the mounting part 11b of the bracket 3, and the friction between the front panel 2 and the rib 16, the dust and the like remain in the inside of the holding members 31, 31. Therefore, when viewing the flat type image display apparatus 1, there is no possibility that dust and the like are noticeable, thereby enabling to maintain good design quality of the flat type image display apparatus 1.

Note that in the flat type image display apparatus 1, the portions of the rib 16 which extend in the up-down direction and are located right and left are shielded by a speaker unit to be described later, and the rib 17 is shielded by the shielding layer 9. Hence, even if dust and the like occur at the portions at which these ribs 16, 17 are located, the dust and the like are shielded and there is no possibility that they are noticeable when viewing the flat type image display apparatus 1.

As described in the foregoing, the connection between the front panel 2 and the bracket 3 can be performed easily by the engagement between the engagement protrusions 34a, 34a, . . . of the holding members 31, 31 and the engagement slots 20, 20, . . . of the bracket 3. It is therefore able to improve operating performance in the connecting operation.

Additionally, unlike the case where the front panel 2 and the bracket 3 are connected together by adhesion, there is no possibility of causing a trouble such as peeling and the like due to secular change and a trouble of design quality deterioration due to discoloration of adhesive.

Further, the connection between the front panel 2 and the bracket 3 can be performed only by sliding the holding members 31, 31 in a predetermined direction and then engaging the engagement protrusions 34a, 34a, . . . to the stopper parts 20b, 20b, . . . of the engagement slots 20, 20, . . . of the bracket 3. It is therefore able to simplify the operation and reduce the operation time.

In addition, the engagement protrusions 34a, 34a, . . . are disposed in the internal surface of the holding members 31, 31. Therefore in the state that the front panel 2 and the bracket 3 are connected together by the holding members 31, 31, the portions at which the engagement protrusions 34a, 34a, . . . are engaged to the engagement slots 20, 20, . . . are invisible, thereby enabling to maintain good design quality of the flat type image display apparatus 1.

In addition, the mounting part 11b for mounting the front panel 2 is disposed at the lower end of the bracket 3. It is therefore able to dispose easily the front panel 2 in the bracket 3, and also able to prevent the front panel 2 from dropping out of the bracket 3.

In addition, the ribs 16, 17 projecting to the front panel 2 side are disposed in the front surface of the bracket 3, and at least part of the ribs 16, 17 is shielded by the holding members 31, 31. Hence, even if dust and the like occur due to friction between the front panel 2 and the bracket 3, the dust and the like remain in the inside of the holding members 31, 31. Therefore there is no possibility that the dust and the like are noticeable when viewing the flat type image display apparatus 1, thereby enabling to maintain good design quality of the flat type image display apparatus 1.

Although the foregoing illustrates the example that the engagement protrusions 34a, 34a, . . . are disposed in the holding members 31, 31, and the engagement slots 20, 20 are formed in the bracket 3, conversely, engagement slots may be formed in the holding members 31, 31 and engagement protrusions may be provided in the bracket 3 so as to have engagement between the two.

Alternatively, engagement protrusions or engagement slots may be formed in the front panel 2 in place of the bracket 3, so that they engage to engagement slots or engagement protrusions formed in the holding members 31, 31.

Further, it is possible that in place of engagement slots, engagement holes are formed and used as an engagement portion to be held.

Figure 15:
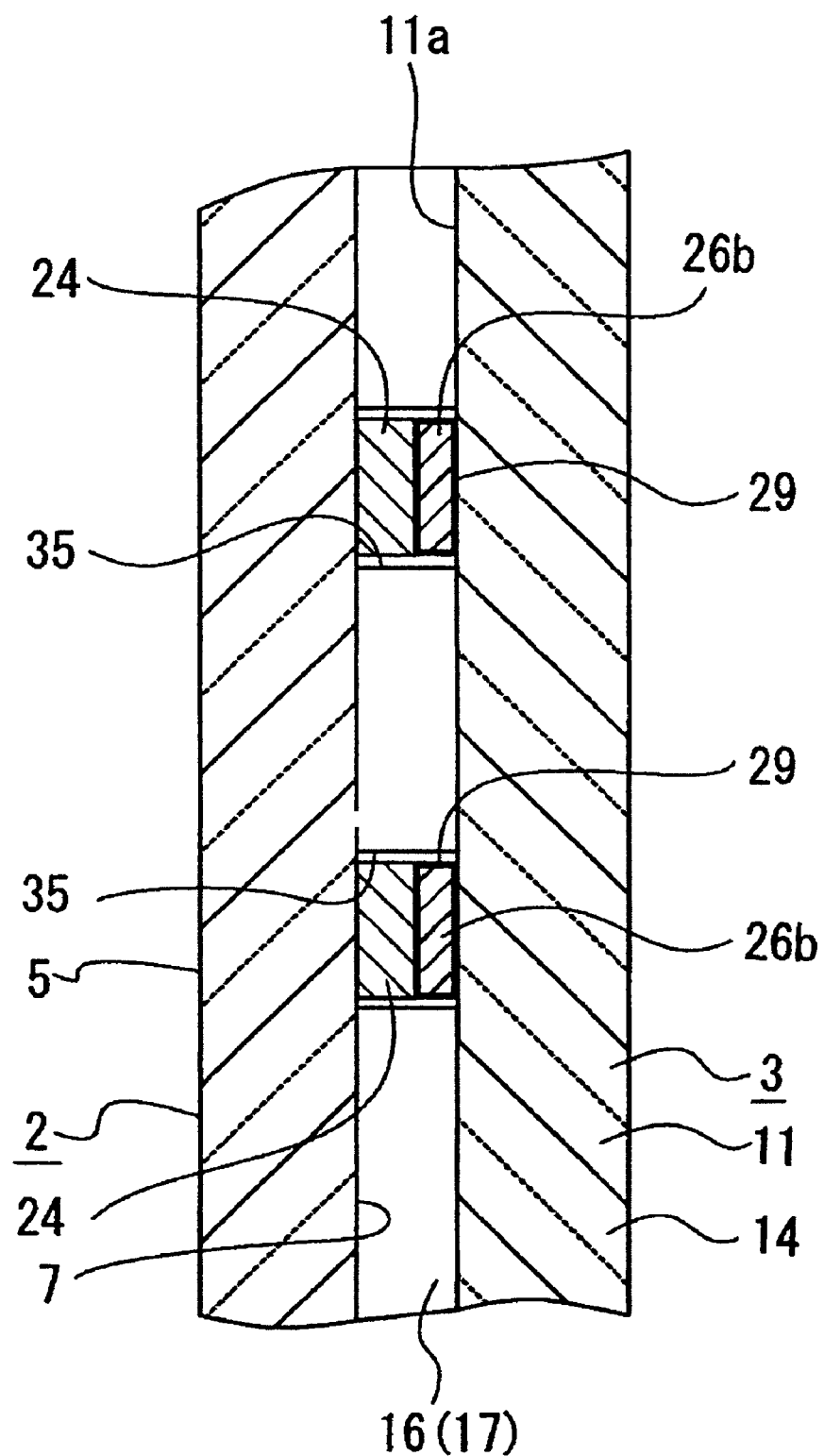
FIG. 15 is an enlarged sectional view showing the state that the front panel and the bracket are connected together to form a signal path.

In the state that the front panel 2 and the bracket 3 are connected together in the above-mentioned manner, the conductive members 21, 21, . . . which are previously attached in a partly overlapped state to the bracket 3, and the earth wiring sheets 25, 25, are disposed at a boundary portion between the front panel 2 and the bracket 3 (see FIG. 15). Hence, disposing space where the conductive members 21, 21, . . . and the earth wiring sheets 25, 25 are disposed is formed in the boundary portion between the front panel 2 and the bracket 3. This disposing space is defined as signal paths 35, 35 that become a path of various electric signals (see FIG. 8, FIG. 9 and FIG. 15).

The apparatus body section 4 has its front surface a screen surface 4a, and a plasma display panel (PDP) is used as a screen. The apparatus body section 4 is provided with a driving circuit, which is not shown, to execute driving of the PDP.

A light receiving section 36 that receives infrared light by remote control operation is disposed at, for example, a lower right location in the front surface of the apparatus body section 4 (see FIG. 1 and FIG. 2).

The apparatus body section 4 is mounted at the apparatus mounting section 12 of the bracket 3 by suitable means such as screwing. In the state that the apparatus body section 4 is mounted at the apparatus mounting section 12, the infrared absorption film 8 stuck to the attached part 7a of the front panel 2 is positioned so as to oppose to the screen surface 4a, and the transmitting hole 9a that is formed in the shielding layer 9 disposed in the front panel 2 is located in front of the light receiving section 36 (see FIG. 2).

In the state that the apparatus body section 4 is mounted at the apparatus mounting section 12, the portion of the apparatus body section 4 which is mounted at the apparatus mounting section 12 and the inner peripheral side portion of the bracket 3 are shielded by the shielding layer 9 disposed in the front panel 2, so that the part of the apparatus body section 4 which is mounted at the apparatus mounting section 12 and the inside portion from the rib 17 of the bracket 3 are invisible from front.

As described above, in the flat type image display apparatus 1, the infrared absorption film 8 is stuck only to the attached part 7a opposing to the screen surface 4a of the front panel 2, and the light receiving section 36 is disposed behind the non-attached part 7b (see FIG. 2). Hence, even in the flat type image display apparatus 1 requiring no holding frame called bezel that holds the screen, it is able to perform operation from the exterior by means of the remote control apparatus 100, thereby enabling to achieve functional improvement of the flat type image display apparatus 1.

In addition, it is unnecessary to dispose the light receiving section 36 on the front surface side of the front panel 2, thus enabling to maintain good design quality of the flat type image display apparatus 1.

Further, in the flat type image display apparatus 1, the shielding layer 9 that shields the apparatus mounting section 12 of the bracket 3 is formed in the front panel 2, and the transmitting hole 9a that is small in diameter, through which infrared light emitted from the remote control apparatus 100 is transmitted, is formed in the shielding layer 9. Therefore, shielding function obtained through the shielding layer 9 can be compatible with operational function obtained through the remote control apparatus 100.

When the apparatus body section 4 is mounted at the apparatus mounting section 12, the second terminal parts 23, 23, . . . of the conductive members 21, 21, . . . , which are fixed to the bracket 3, are connected via a predetermined connecting terminal, a lead wire and the like, to a control circuit, which is not shown, of the apparatus body section 4.

In the state that the apparatus body section 4 is mounted at the apparatus mounting section 12, a body cover 37 covering the apparatus body section 4 is attached to the rear surface of the bracket 3 (see FIG. 1). A draw-out hole 37a for drawing out a power supply code and the like is formed in the body cover 37.

Figure 4:
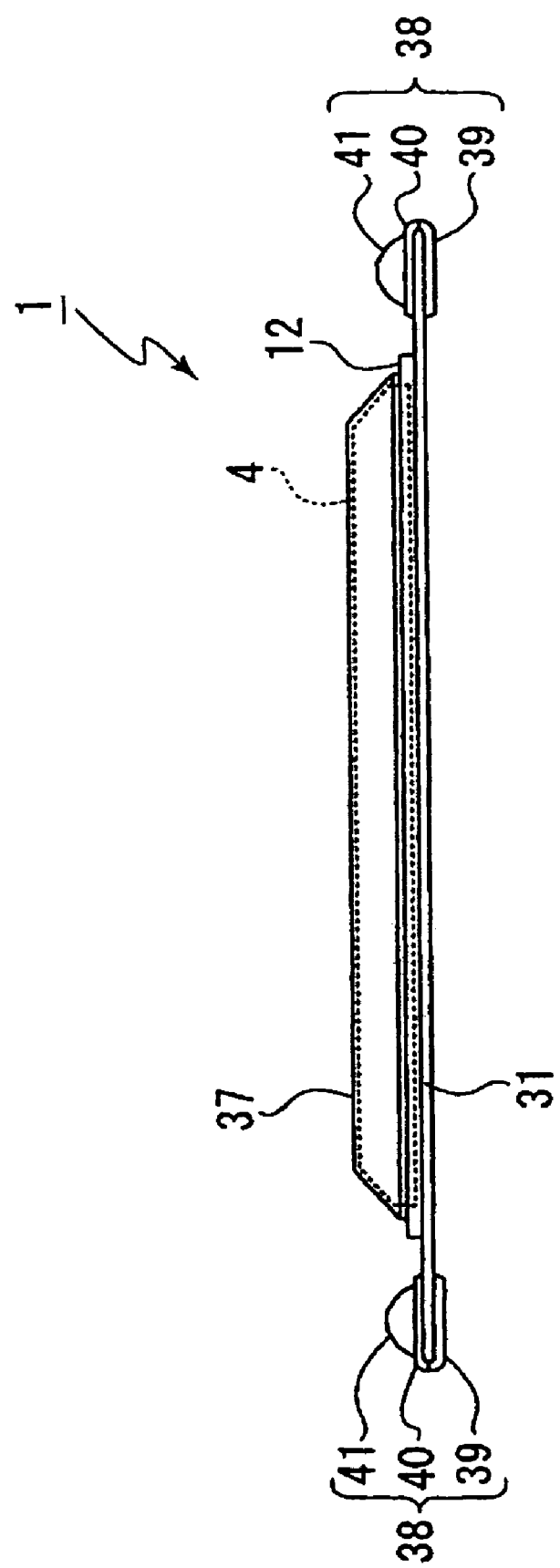
FIG. 4 is a plan view of a flat type image display apparatus.

Speaker units 38, 38 are fixed to both right and left ends of the bracket 3, respectively (see FIG. 1, FIG. 3 and FIG. 4). The speaker units 38, 38 are fixed to the parts fixing sections 13, 13, . . . of the bracket 3.

The speaker unit 38 is provided with a speaker grill 39, a speaker box 40, and a speaker case 41, and a speaker, which is not shown, is disposed in the speaker case 41. The speaker has a role as a functional section that exhibits the function of receiving electric signals and outputting sound. In the speaker unit 38, the speaker grill 39 and the speaker box 40 are disposed so as to sandwich at the front and rear the parts fixing sections 13, 13 located above and below the bracket 3, and the speaker case 41 is fixed to the rear surface of the speaker box 40.

In the state that the speaker units 38, 38 are fixed to the bracket 3, both right and left ends of the holding members 31, 31 are sandwiched and blocked at the front and rear by the speaker grills 39, 39 and the speaker boxes 40, 40 (see FIG. 4).

In the state that the speaker units 38, 38 are fixed to the bracket 3, both right and left ends of the frame section 11 is shielded by the speaker grills 39, 39, so that the outside portion from the rib 16 of the bracket 3 is invisible from front.

Thus, both right and left ends of the frame section 11 can be shielded by the speaker grill 39 and, as described above, the inner peripheral side area of the bracket 3 can be shielded by the shielding layer 9 disposed in the front panel 2. Hence, when the flat type image display apparatus 1 is viewed from front, only the connecting parts 24, 24, . . . which are narrow in width and formed linearly, of the conductive members 21, 21, . . . are visible in transparent portions corresponding to both right and left ends of the front panel 2 (see FIG. 3). Accordingly, good design quality of the flat type image display apparatus 1 is maintained, thus it would not cause a sense of strangeness in its appearance.

When the speaker units 38, 38 are fixed to the parts fixing sections 13, 13, . . . , the first terminal parts 22, 22, . . . of the conductive members 21, 21, . . . , which are fixed to the bracket 3, are connected via a predetermined connecting terminal, a lead wire and the like to a sound output circuit, which is not shown, of the speaker.

As described above, in the flat type image display apparatus 1, the signal paths 35, 35, . . . for performing sending and receiving of electric signals between the apparatus body section 4 and the speaker are formed in the boundary portion between the front panel 2 and the bracket 3. Hence, there is no possibility that the conductive members 21, 21, . . . and the earth wiring sheets 25, 25 are bare. In addition, since there is no possibility that the conductive members 21, 21, . . . and the earth wiring sheets 25, 25 are bare, any cover for covering the conductive members 21, 21, . . . and the earth wiring sheets 25, 25 is not required, thereby reducing the manufacturing cost because of a reduction in the number of parts.

Additionally, since the signal paths 35, 35, . . . do not exist on the outer surface side of the front panel 2 and the bracket 3, it would not cause a sense of strangeness in its appearance when viewing the flat type image display apparatus 1, thereby enabling to maintain good design quality of the flat type image display apparatus 1.

Further, since in the flat type image display apparatus 1, the conductive members 21, 21, . . . , which are formed by a metal plate, are disposed in the signal paths 35, 35 so as to send and receive electric signals, it is capable of performing reliably sending and receiving of electric signals. There is no possibility of causing shortage of current capacity as in the case where a leadwire, conductive sheet and conductive printing layer are used to perform sending and receiving of electric signals.

Furthermore, since the earth wiring sheets 25, 25 are also disposed in the signal paths 35, 35, . . . , another space for disposing the earth wiring sheets 25, 25 is not required, besides the space for disposing the conductive members 21, 21, . . . .

In addition, since the connecting parts 24, 24, . . . of the conductive members 21, 21, . . . are disposed in the signal paths 35, 35, . . . in the state that they are superposed at the front and rear in the long-direction parts 26b, 26b, . . . of the earth wiring sheets 25, 25, the operation for disposing the conductive members 21, 21, . . . and the earth wiring sheets 25, 25 in the signal paths 35, 35, . . . is easy. Also, since the earth wiring sheets 25, 25 are shielded by the conductive members 21, 21, . . . , it would not cause a sense of strangeness in its appearance when viewing the flat type image display apparatus 1, thereby enabling to maintain good design quality of the flat type image display apparatus 1.

Although the foregoing illustrates the example that the long-direction parts 26b, 26b, . . . of the earth wiring sheets 25, 25 are superposed on the rear side of the connecting parts 24, 24, . . . of the conductive members 21, 21, . . . , conversely, the long-direction parts 26b, 26b, . . . of the earth wiring sheets 25, 25 may be superposed on the front side of the connecting parts 24, 24, . . . of the conductive members 21, 21, . . . .

Although the foregoing illustrates the example that the conductive members 21, 21, . . . and the earth wiring sheets 25, 25 are disposed in the signal paths 35, 35, . . . , it is also possible to dispose, instead of these, for example, transparent conductive members in the signal paths 35, 35, . . . . By disposing the transparent conductive members, it would not cause a sense of strangeness in its appearance at all when viewing the flat type image display apparatus 1, and it is capable of maintaining good design quality of the flat type image display apparatus 1.

It is also possible that for example, the signal paths 35, 35, . . . are formed as an optical path of infrared light, so that sending and receiving of electric signals between the apparatus body section 4 and the speakers are performed through infrared light. Thus, with the use of infrared light, it is unnecessary to dispose tangible entity such as the conductive members 21, 21, . . . in the signal paths 35, 35, . . . . It would not cause a sense of strangeness in its appearance at all when viewing the flat type image display apparatus 1, and it is capable of maintaining good design quality of the flat type image display apparatus 1.

Additionally, with the use of infrared light, it is unnecessary to form the disposing notches 16a, 16a, . . . , 17a, 17a, . . . in the ribs 16, 17. For example, the inside of the bracket 3 can also be used as a signal path.

Although the foregoing illustrates the speakers that receive electric signals and execute sound output, as an example of the functional section, the functional section may be such a section that sends and receives electric signals and exhibits a predetermined function. For example, the functional section may also be various signal input/output sections that operate on receiving a command signal, a microphone through which sound input is performed, various operation sections that send command signals, or the like.

All of the shapes and structures of the individual sections described in the foregoing preferred embodiment are mere examples of implementation performed in practicing the present invention, and it is to be understood that the technical scope of the present invention should not be interpreted as limiting by these.

INDUSTRIAL APPLICABILITY

As apparent from the foregoing description, the flat type image display apparatus of the present invention is characterized by including: a bracket that has a frame section integrally formed by a transparent material, an apparatus mounting section disposed in the inner peripheral edge of the frame section, and parts fixing sections disposed on the outside of the frame section; a plate-like front panel that is formed by a transparent material and disposed on the front surface side of the bracket; an apparatus body section that has a screen surface and is mounted at the apparatus mounting section of the bracket; a holding member that holds the front panel and the bracket in such a way that they are connected together at the front and rear; and a functional section that is fixed to the parts fixing section of the bracket and disposed on the outside of the front panel, and that also sends and receives electric signals to exhibit a predetermined function, wherein a signal path performing sending and receiving of electric signals between the apparatus body section and the functional section is formed in the inside of the bracket or in a boundary portion between the front panel and the bracket.

Accordingly, there is no possibility that the signal path is bare on the outer surface side of the front panel and the bracket. In addition, since there is no possibility that the signal paths are bare, any cover for covering the signal path is not required, thereby enabling to reduce the manufacturing cost because of a reduction in the number of parts.

Additionally, since the signal path does not exist on the outer surface side of the front panel and the bracket, it would not cause a sense of strangeness in its appearance when viewing a flat type image display apparatus, thereby enabling to maintain good design quality of the flat type image display apparatus.

In the invention described in claim 2, a conductive member formed by a metal plate is disposed in the signal path so as to perform, through the conductive member, sending and receiving of electric signals between the apparatus body section and the functional section, it is capable of performing reliably sending and receiving of electric signals, and there is no possibility of causing shortage of current capacity as in the case where a lead wire, conductive sheet and conductive printing layer are used to perform sending and receiving of electric signals.

In the invention described in claim 3, a transparent conductive member is disposed in the above-mentioned signal paths so as to perform, via the transparent conductive members, sending and receiving of electric signals between an apparatus body section and a functional section. Hence, it would not cause a sense of strangeness in its appearance at all when viewing a flat type image display apparatus, and it is capable of maintaining good design quality of the flat type image display apparatus.

In the invention described in claim 4, the above-mentioned signal path is formed as an optical path of infrared light so as to perform, through infrared light, sending and receiving of electric signals between an apparatus body section and a functional section. It is therefore unnecessary to dispose a tangible entity such as a conductive member and the like in the signal path, it would not cause a sense of strangeness in its appearance at all when viewing a flat type image display apparatus, and it is capable of maintaining good design quality of the flat type image display apparatus.

In the invention described in claim 5, an earth wiring sheet to perform earthing of a functional section is disposed, and the earth wiring sheet is disposed in the above-mentioned signal path. Hence, another space for disposing the earth wiring sheet is not required, besides the space for disposing the conductive members.

In the invention described in claim 6, an earth wiring sheet to perform earthing of the functional section is provided and disposed in the signal path in the state that the above-mentioned earth wring sheet is superposed at the front and rear with the above-mentioned conductive member. Hence, the operation for disposing the conductive member and the earth wiring sheet in the signal path is easy. Also, since the earth wiring sheet or the conductive member is shielded by the earth wiring sheet or the earth wiring sheet, it would not cause a sense of strangeness in its appearance when viewing a flat type image display apparatus, thereby enabling to maintain good design quality of the flat type image display apparatus.

The invention claimed is:

1. A flat type image display apparatus including a screen section for displaying an image, the apparatus comprising:
a transparent section in a bracket at which the screen section is mounted, disposed outside the screen section, the transparent section being capable to allow a user to view backward of the flat type image display apparatus from a front position,
wherein the transparent section is formed in a frame-shape and surrounds a circumference of the screen section, and
wherein a disposing recess at which a front panel of the flat type image display apparatus is disposed is formed in the transparent section in the bracket, and
wherein the front panel is disposed at a front side of the screen section and connected with in the bracket by a plurality of holding members, connection between the front panel and the bracket is performed by engagement between engagement protrusions of the plurality of holding members and engagement slots of the bracket without adhesion;
wherein signal paths, where conductive members and earth wiring sheets are disposed, for performing sending and receiving of electric signals between an apparatus main body and a speaker are formed in boundary portion between the front panel and the bracket which is configured to hold the apparatus main body and formed of transparent material, so that the signal paths are not exposed and the conductive members and the earth wiring sheets are not bare without a cover for covering the signal paths.

2. The flat type image display apparatus according to claim 1, wherein:
   the screen section is formed in a substantially rectangular shape; and
   the transparent section includes one or more transparent portions disposed on one or more sides of the screen section, respectively.

3. The flat type image display apparatus according to claim 1, wherein:
   the transparent section includes a pair of transparent portions disposed on a pair of sides of the screen section, respectively, the pair of sides being arranged so as to face each other.

4. The flat type image display apparatus according to claim 1, further comprising:
   an apparatus main body, in front of which the screen section is integrally formed; and
   wherein the bracket and the transparent section are integrally formed.

5. The flat type image display apparatus according to claim 4, further comprising:
   a shielding layer section formed between the screen section and the transparent section, the shield layer section blocking the backward viewing.

6. The flat type image display apparatus according to claim 5, wherein:
   the shielding layer section includes one or more shielding portions disposed on the bracket.

7. The flat type image display apparatus according to claim 5, further comprising:
   a front panel formed in a substantially rectangular shape and made of transparent material, the front panel being disposed at a front side of the screen section and the bracket, the front panel having a plate-like shape,
   wherein the shielding layer section includes one or more shielding portions disposed on the front panel.

* * * * *